United States Patent Office 3,488,333
Patented Jan. 6, 1970

3,488,333
SUPPORTED TRANSITION METAL CATALYST AND PROCESS FOR THE POLYMERIZATION AND COPOLYMERIZATION OF α-OLEFINS
Henri Lefebvre, Jemeppe-sur-Sambre, and Roger Dechenne, Strombeek, Belgium, assignors to Solvay & Cie, Brussels, Belgium, a Belgian corporation
No Drawing. Filed Feb. 23, 1967, Ser. No. 617,866
Claims priority, application France, Feb. 24, 1966, 50,946
Int. Cl. C08f 1/42; B01j 11/84
U.S. Cl. 260—88.2                                13 Claims

ABSTRACT OF THE DISCLOSURE

Olefins are polymerized and copolymerized in the presence of a catalyst comprising the reaction product of at least one transition metal compound and a polycondensation derivative of formaldehyde and an amino compound and an activator selected from the group consisting of the metals of Groups I to III of the Periodic Table and hydrides and organometallic compounds of said Groups I to III metals.

BACKGROUND OF THE INVENTION

The present invention relates to a process for the polymerization and the copolymerization of olefins in the presence of new solid catalysts and to the catalysts themselves.

It has already been proposed to polymerize ethylene in the presence of a catalyst consisting of an organometallic compound and a derivative of a transition metal deposited on an inert support or carrier which could be, for example, preformed polyethylene (Belgian Patent No. 552,550). In this process, the catalyst is deposited on the surface of a macromolecular compound (polyethylene) which is identical to the polymer which it is intended to prepare.

Another catalyst of the prior art is provided by chemically binding a catalyst compound to a macromolecular compound having reactive groups. British Patent No. 834,217 describes a method of this type in which titanium tetrachloride is reacted with cellulose to form titanium esters of cellulose. These esters are thereafter activated by means of organometallic compounds. The chemical activities obtained with catalysts of the above type are extremely low since cellulose has a high number of reactive groups, such as hydroxyl groups. The titanium derivative is bound to the cellulose support through all its valences and cross-links the support which becomes nearly inactivated.

By selecting a support or carrier having a suitably predetermined number of hydroxyl groups, it is possible to produce a catalyst having a much higher chemical activity. Belgian Patent No. 663,922 describes a process wherein a copolymer of vinyl alcohol, having a 1 to 20% molar content of vinyl alcohol in its molecules, is used as the support or carrier. However, when used at a high temperature, the copolymer support is less stable than the polyolefin produced. It is therefore possible to obtain colored by-products which modify the appearance of the polyolefin.

SUMMARY OF THE INVENTION

It has been found, according to the invention, that by using as a support or carrier a polycondensation product derived from formaldehyde and an amino compound, the support thereafter being reacted with at least one compound of a transition metal and activated with an activator selected from the group consisting of the metals of Groups I, II and III of the Periodic Table and hydrides and organometallic compounds of the Groups I, II and III metals, the catalysts thereby produced have a high chemical activity and are free of the disadvantages inherent in the supported catalysts referred to above. In further accordance with the invention, olefins are polymerized and copolymerized while in contact with a catalyst of the invention.

The support or carrier may be made by any method known in the art for the preparation of a resin which is a polycondensation product of formaldehyde and amino derivatives.

DESCRIPTION OF THE PREFERRED EMBODIMENTS

A resin which is particularly suitable may be obtained by reacting melamine with an excess of formaldehyde. This resin may be prepared by a very simple process which comprises heating under reflux melamine and an aqueous solution of formaldehyde. The chemical reaction comprises two stages. In the first stage, formaldehyde is bound to the amino groups of melamine to form the groups

In the second stage, there is a condensation of some of these groups. The higher the temperature and the greater the duration of the heating, the higher is the number of the condensation reactions. Consequently, it is possible to influence the number of active groups —$CH_2OH$ which are available to react with the transition metal compound. Two parameters may be varied for that purpose: the amount of formaldehyde used and the degree of cross-linking by heating.

Other resins may be used as the support, such as urea-formaldehyde resins which have similar hydroxyl groups.

The mechanism by which the transition metal compounds are chemically bound by means of the OH groups is represented by the following equation, in which M' represents a transition metal and X is a monovalent reactive group on the transition metal M':

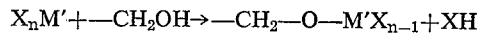

The transition metal compounds which may be used for the preparation of the new catalysts are selected from those provided with radicals having a good chemical reactivity with respect to hydroxyl groups. Particular, halides, alkoxy-halides and alkoxides of the metals of Groups IVb, and Vb and VIb of the Periodic Table, and, preferably, of titanium and vanadium may be used, for example $TiCl_4$, $Ti(OC_2H_5)_3Cl$, $VOCl_3$, $VCl_5$ or

The binding reaction of the transition metal compound with the support liberates decomposition products. For example, when the transition metal compound is a chloride, hydrogen chloride is evolved as follows:

When the transition metal compound is an alkoxide, the corresponding alcohol is produced. The decomposition products along with any excess of the reactants are eliminated by washing the catalyst.

The binding reaction must be carried out under anhydrous conditions. Generally, the quantity of the transition metal compound on the support is increased if the temperature of the reaction is raised. However, in order to prevent a complete degradation or cross-linking of the resin, the temperature must not be raised to too high a level. Since the processes of making the resins employed in the invention are known, the temperatures in each case at which complete degradation or cross-linking occur are also known.

The resin, which is dried and finely pulverized, may be mixed with the pure transition metal compound. To carry out the reaction, the mixture preferably is heated to a temperature slightly lower than the boiling point of the transition metal compound. Alternatively, the transition metal compound may be dissolved in a hydrocarbon such as hexane, xylene or tetralin and the support suspended in this solution. After cooling to room temperature, the reaction product (i.e., the transition metal compound reacted onto the resin support) is washed with an anhydrous hydrocarbon such as hexane and is thereafter dried.

The supported catalyst component is activated by means of an activator selected from the group consisting of the metals of Groups I, II, and III of the Periodic Table and hydrides and organometallic compounds of the Groups I, II and III metals. Trialkyl aluminum and alkyl aluminum halides are particularly suitable as activators.

The catalysts of the invention may be used for the polymerization and the copolymerization of olefins, such as for the preparation of polyethylene, polypropylene, polybutene and copolymers of ethylene and propylene. These polymers and copolymers may be vulcanized according to well known processes whereby they acquire excellent mechanical properties.

The polymerization and copolymerization may be carried out according to known methods: in gaseous phase, i.e., in the absence of any liquid solvent for the monomer, or in the presence of a dispersing medium in which the monomer is soluble. An inert hydrocarbon which is a liquid under the polymerization conditions, or the monomers which are maintained in a liquid state by their pressure of saturation, are suitable liquid dispersing media.

The following examples are given to illustrate the invention without intending to be limiting.

EXAMPLE 1

(a) Preparation of the melamine-formaldehyde resin

Into a liter container provided with a reflux condenser, there is introduced 1 mol (126 g.) of melamine and 4.5 mols of formaldehyde (365 g. of a 37% aqueous solution). The mixture is blended thoroughly and heated under reflux for 20 minutes. After cooling the resultant reaction product, there is obtained a white solid which is dried for 2 hours and 30 minutes at a temperature of 75° C. in a ventilated drier. The solid mass is pulverized to particle sizes of 500 microns. The pulverized product is thereafter again dried for 3 hours at 120° C. under a flow of nitrogen.

(b) Reaction with $TiCl_4$ 30 g. of a melamine-formaldehyde resin prepared as above is suspended in 150 cc. of pure $TiCl_4$. The temperature of the mixture is raised to 130° C. in a period of 45 minutes and is maintained constant for a period of one hour. The mixture is thereafter cooled down to room temperature. The resultant solid reaction product is separated, washed thoroughly with anhydrous hexane and dried. The product (i.e., $TiCl_4$ reacted onto melamine-formaldehyde resin) contains 175 g. of Ti per 1,000 g.

(c) Polymerization of ethylene

Into a 3 liter stainless steel autoclave dried and flushed with nitrogen, there is introduced successively, 0.955 g. of an activator, $Al(i-C_4H_9)_3$, in solution in hexane, 1 liter of purified hexane and 0.73 g. of the supported catalyst component prepared as hereinabove.

The mixture is continuously blended and, meanwhile, the temperature thereof is raised to 80° C. Hydrogen and ethylene, each maintained under a partial pressure of 10 kg./cm.$^2$, are introduced into the autoclave. The total pressure is maintained constant for the duration of the reaction by introducing ethylene into the autoclave.

After 2 hours, 196 g. of polyethylene have been produced. This represents a yield of 268 g. of polyethylene per gram of catalyst.

EXAMPLE 2

Propylene is polymerized by means of a catalyst which is identical to the one used in Example 1.

Into a 1.5 liter autoclave there is introduced successively 6.15 g. of the activator $Al(i-C_4H_9)_3$, 0.864 g. of the catalyst, 500 cc. of purified hexane and finally 250 g. of propylene.

The mixture is stirred and heated at 50° C. for a period of 5 hours. 17 g. of polypropylene is produced. The yield is 19 g. of polypropylene per gram of catalyst.

EXAMPLE 3

Ethylene and propylene are copolymerized in the absence of solvent, in the presence of a catalyst identical to the one used in Example 1.

2.736 g. of the activator $Al(i-C_4H_9)_3$ in solution in hexane, 0.846 g. of the catalyst and 335 g. of propylene are successively introduced into a 1.5 liter autoclave. By introducing ethylene into the autoclave the pressure is raised to 19.2 kg./cm.$^2$. The temperature is raised to 40° C. while stirring and maintaining a constant total pressure by the addition of ethylene. There is obtained a solution containing 7.5 mol percent of ethylene in liquid propylene.

After 2 hours, 95 g. of an amorphous, elastomeric copolymer of ethylene and propylene are produced. The copolymer contains 41 mol percent of propylene as determined by infrared analysis. The yield is 112 g. of the copolymer of propylene and ethylene per gram of catalyst.

The following composition is prepared by using the above copolymer:

100 parts of the copolymer;
50 parts of HAF carbon black;
5 parts of dicumyl peroxide (Dicup 40C);
0.3 part of Crystex sulfur.

This composition is vulcanized for 45 minutes at a temperature of 165° C. The vulcanized composition has the following mechanical properties:

Modulus of elasticity at 100% elongation kg./cm.$^2$__ 22
Modulus of elasticity at 300% elongation kg./cm.$^2$__ 117
Breaking load _____kg./cm.$^2$__ 234
Elongation at rupture _____percent__ 435

The copolymer of propylene and ethylene prepared according to the process of the invention has excellent mechanical properties after having been vulcanized.

EXAMPLE 4

10 g. of a resin prepared as described in Example 1a is suspended in 10 ml. of $VOCl_3$ and 30 ml. of $TiCl_4$ which have been purified, and the mixture is stirred. The temperature is raised to 90° C. in a period of 40 minutes and that temperature is maintained for a period of 1 hour. The mixture is cooled down, and the resultant solid reaction product is separated and washed thoroughly with anhydrous hexane, and is finally dried. The solid catalytic product contains 0.4 g. of vanadium and 63 g. of titanium per kilogram.

1.178 g. of the solid obtained in the preceding step and 3.132 g. of triisobutylaluminum are used to carry out a test in which ethylene and propylene are copolymerized under the same conditions as given in Example 3. After 5 hours and 30 minutes, 73 g. of an elastomeric copolymer are produced.

EXAMPLE 5

As described in Example 4, but at a temperature of 115° C., a reaction is carried out between 13.5 g. of the same melamine-formaldehyde resin, 20 ml. of $VOCl_3$ and 20 ml. $TiCl_4$. A solid product containing 75 g. of Ti and 3.2 g. of V per kilogram is obtained. 1.722 g. of this solid product and 3.915 g. of triisobutylaluminum were used in a test for copolymerizing ethylene and propylene under the conditions given in Example 3, and after 5 hours and 30 minutes 51 g. of an elastomeric copolymer were produced.

EXAMPLE 6

(a) Preparation of urea-formaldehyde resin

Into a 0.5 liter container provided with a reflux condenser and stirrer, there is introduced 130 g. of a 37% formaldehyde aqueous solution brought to a pH of 7.5 by adding a 0.1 N caustic soda solution, and 60 g. of urea.

The mixture is heated under reflux and stirred for 5 hours. The temperature is brought to 85° C. and water is removed under vacuum until there is a decisive increase in the viscosity of the solution. The solution is acidified with acetic acid and the temperature thereof is raised to 100° C. A white hard solid product is thus obtained. This product is pulverized, dried under vacuum at 60° C. for 5 hours and kept under a nitrogen atmosphere.

(b) Reaction with $TiCl_4$ 21 g. of the urea-formaldehyde resin as described above are suspended in 100 ml. of pure $TiCl_4$. The temperature of the mixture is raised to 130° C. in a period of 1 hour and that temperature is maintained for an additional 3 hours. The mixture is cooled. The resultant solid is separated, washed thoroughly with anhydrous hexane and dried. The solid contains 1.8 g. of titanium per kilogram.

(c) Copolymerization of ethylene and propylene

The test is carried out under the conditions outlined in Example 3 with 5.018 g. of the solid prepared as described above and 0.783 g. of triisobutylaluminum. After 7 hours, 32 g. of an elastomeric copolymer were obtained.

EXAMPLE 7

The test for the copolymerization of ethylene and propylene is repeated under the same conditions but using 3.654 g. of a solid catalyst obtained by reacting a urea-formaldehyde resin with $TiCl_4$ and containing 0.7 g. of titanium per kilogram. After only 55 minutes, there is obtained 7.7 g. of a solid product which, by separating the solid catalyst, yields 4 g. of an elastomeric ethylene-propylene copolymer. The catalytic activity is 565 g. of copolymer per hour and per g. of $TiCl_4$ bound to the resin.

Although specific embodiments of this invention are described herein, it will be understood that modifications are permissible within the spirit of the invention, the scope of which is to be determined from the appended claims only.

What we claim and desire to secure by Letters Patent is:

1. A process for the polymerization of α-olefins and the copolymerization of α-olefins with one another which comprises carrying out said polymerization and said copolymerization in the presence of a catalyst constituted by
   (a) the product of reaction between at least one transition metal compound selected from the group consisting of a halide, haloalkoxide and alkoxide of a transition metal of Groups IV*b*, V*b* and VI*b* of the Periodic Table and a polycondensation derivative of formaldehyde and an amino compound and
   (b) an activator selected from the group consisting of metals of Groups I to III and hydrides and organometallic compounds of said Groups I to III metals.

2. Process according to claim 1 in which said transition metal is selected from at least one member of the group which consists of titanium and vanadium.

3. Process according to claim 2 in which said transition metal compound is selected from at least one member of the group consisting of titanium tetrachloride and vanadium oxytrichloride.

4. Process according to claim 1 in which said transition metal is selected from at least one member of the group which consists of titanium and vanadium and in which said activator is trialkyl aluminum.

5. Process according to claim 1, in which the polycondensation derivative is selected from the group consisting of melamine-formaldehyde and urea-formaldehyde resins.

6. Process according to claim 1, in which the transition metal compound is titanium tetrachloride.

7. Process according to claim 1, in which the activator is selected from the group consisting of trialkyl aluminums and alkyl aluminum halides.

8. Process according to claim 1, in which the olefins are selected from the group consisting of ethylene, propylene and butene-1.

9. Process according to claim 1, in which ethylene and propylene are copolymerized.

10. As a new industrial product, the catalytic component obtained by reaction of at least one transition metal compound selected from a member of the group consisting of a halide, haloalkoxide and alkoxide of the metals of Groups IV*b*, V*b* and VI*b* of the Periodic Table and a polycondensation derivative of formaldehyde and an amine compound whereby said transition metal is chemically bound to said polycondensation derivative as a result of reaction with hydroxyl groups of said derivative.

11. A new industrial product according to claim 10 in which said transition metal compound is selected from at least one member of the group consisting of a halide, haloalkoxide and an alkoxide of titanium and vanadium.

12. A new industrial product according to claim 11 in which said catalytic component is combined with a trialkyl aluminum activator.

13. A new industrial product according to claim 10 in which said catalytic component is combined with an activator selected from the group consisting of metals of Groups I to III and hydrides and organometallic compounds of said Groups I to III metals.

References Cited

UNITED STATES PATENTS 3,413,325  11/1968  Berkheimer _____ 252—429

JOSEPH L. SCHOFER, Primary Examiner

ROGER S. BENJAMIN, Assistant Examiner

U.S. Cl. X.R.

252—429, 431; 260—71, 72, 93.7, 94.9